Figures 1, 2:
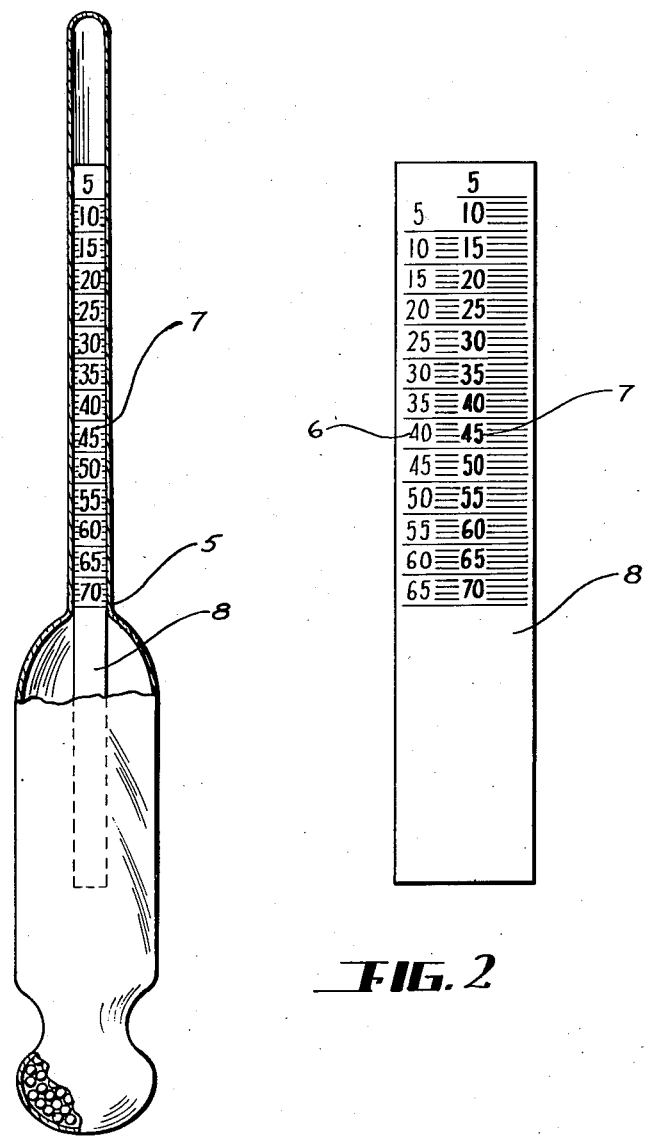

Aug. 14, 1951   R. M. CARSON ET AL   2,564,247
METHOD OF TESTING URINE TO DETERMINE PREGNANCY
Filed Aug. 18, 1947   2 Sheets-Sheet 1

INVENTOR.
RICHARD M. CARSON
REUBEN R. SAEKS
BY
ATTORNEY

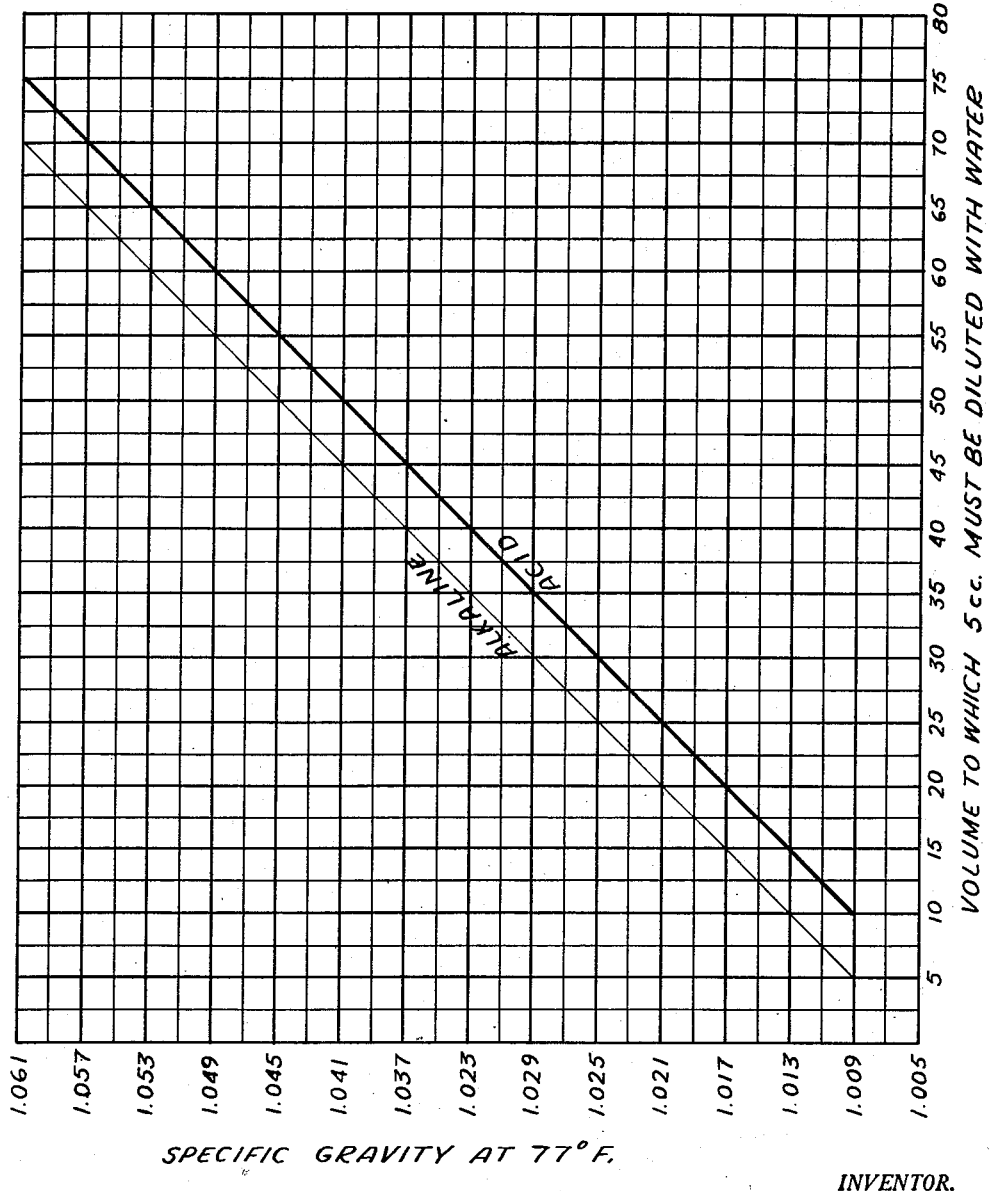

Patented Aug. 14, 1951

2,564,247

UNITED STATES PATENT OFFICE 2,564,247

METHOD OF TESTING URINE TO DETERMINE PREGNANCY

Richard M. Carson and Reuben R. Saeks, Dayton, Ohio

Application August 18, 1947, Serial No. 769,090

3 Claims. (Cl. 23—230)

This invention relates to a method of testing urine to determine pregnancy.

During recent years physicians have stressed the advisability of pre-natal care in cases of pregnancy and this has created an increasing demand for an early diagnosis for pregnancy. Various methods have been proposed for determining pregnancy during the early stages thereof but none have been entirely satisfactory. Some such methods were not of positive accuracy, some were complicated and difficult of performance and not well suited for use in the office of an ordinary physician, and some were very expensive.

One object of the invention is to provide a simple accurate test which can be made by any physician with very little equipment other than that usually found in a physician's office.

A further object of the invention is to provide a method of testing urine for histidine which is easily performed and is accurate in its results.

A further object of the invention is to provide a method for so preparing a specimen of urine for the test that it will detect the presence of histidine in the urine of a pregnant woman but will not indicate the presence of histidine in the urine of a non-pregnant woman.

A further object of the invention is to provide a method of treating the prepared specimen to eliminate therefrom substances which might interfere with the test and to then determine the presence or absence of histidine in the specimen.

A further object of the invention is to provide a hydrometer which indicates, without computation or charts, the extent to which a specimen of urine should be diluted prior to the final test.

Other objects of the invention may appear as the method and hydrometer are described in detail.

In the accompanying drawings Fig. 1 is a front elevation of a hydrometer equipped with a dilution scale; Fig. 2 is a plan view of the hydrometer scale, somewhat enlarged; and Fig. 3 is a chart indicating the required dilution of a specimen without the use of special apparatus.

Histidine is an amino acid which occurs in protein and is essential in the diet. It is believed to be metabolized in the liver and changed to histamine but during pregnancy this function is not performed by the liver and histidine is excreted in some quantity by the kidneys. It has been proposed heretofore to determine pregnancy by testing the urine for histidine. (Knoop, F., Beitr. z. chem. Physiol. u Path., 1907–8, 7, 356. Practical Methods in Biochemistry by Koch and Hanke, published by Williams & Wilkins, 1943, page 50.) However, after a heavy intake of protein the urine of a non-pregnant woman may also show histidine, but in relatively small amounts. If the concentration of the urine is not adjusted, urine from a non-pregnant woman, if of high specific gravity, may appear to have a large amount of histidine. As a result the histidine test as heretofore practiced was inaccurate and unreliable and has been largely discontinued.

For the purpose of avoiding the possibility of the test showing histidine in the urine of a non-pregnant woman we prepare a specimen of urine for the test by reducing the same to a concentration so low that the small amount of histidine in the urine of a non-pregnant woman will not be indicated by the test. The specimen should be diluted to a predetermined concentration in accordance with both the specific gravity and its pH, that is its acidity or alkalinity. An acid specimen requires greater dilution than does an alkaline specimen. In practice we have found that an alkaline specimen having a specific gravity of 1.009 requires no dilution and that an acid specimen having a specific gravity of 1.005 requires no dilution, and specimens of higher specific gravity are diluted to one of aforesaid values. For specific gravities above the aforesaid values a specimen should be diluted as by adding thereto for each increase of .004 in specific gravity a volume of water equal to the initial volume of the specimen which is being diluted. Thus the dilution of the acid specimen begins at a lower specific gravity and the total dilution thereof is greater than the total dilution of the alkaline specimen.

The extent to which the specimen should be diluted depends on the relative values of the specific gravity and the pH of the specimen and in practice it is determined from an empirical ration based on the specific gravity and pH, and in Fig. 3, there is shown a chart based on this ratio and by which the necessary dilution may be easily ascertained. The vertical column of figures represent specific gravity, in units of four, and the horizontal figures represent the total volume to which a specimen having an initial volume of 5 cc. should be diluted. The upper diagonal line A shows the extent to which an alkaline specimen should be diluted according to the specific gravity thereof. The lower line B indicates the extent to which an acid specimen should be diluted, according to its specific gravity.

However, in order to enable the necessary dilution of any specimen to be quickly and accurately determined, we have provided a dilution hydrometer which indicates in figures the total volume to which a given volume of the initial specimen, in the present instance 5 cc., should be diluted to impart thereto a predetermined concentration. As shown in Figs. 1 and 2 the dilution hydrometer comprises a hydrometer tube 5 of conventional shape and is provided with two series of graduations, or scales, 6 and 7, on which specific gravity is measured, and which are numbered in multiples of five to indicate the required dilution for each specific gravity. Preferably the scales are printed on a strip of flexible material 8 which is formed into a cylinder, inserted in the tube and accurately positioned therein, as shown in Fig. 1. The calibrations of the two scales are the same but one of the scales, the scale 7, is of greater length and includes more graduations than the scale 6. Therefore, the numbers on the graduations of the scale 7 are higher than the numbers on the corresponding graduations on the scale 6, this longer scale 7 indicating the dilution required for an acid specimen at each specific gravity. Preferably suitable markings are associated with each scale to visually indicate the type of specimen to which it relates, that is to indicate that scale 6 relates to an alkaline specimen and that scale 7 relates to an acid specimen. Preferably the numbers which indicate the extent of dilution on the alkaline scale are in red and the numbers which indicate the extent of the dilution on the acid scale are in brown. On the drawing the red numbers are shown in light black and the brown numbers in heavy black.

In the use of the dilution hydrometer the alkalinity or acidity of the specimen is first determined and a dilution hydrometer reading then taken of the specimen to indicate the required dilution. Preferably 3 cc. of the specimen is placed in a test tube or other transparent container and two drops of a color change indicator, such as Phenol Red, are added thereto. If the specimen is acid the color thereof will change to yellow, but if the specimen is alkaline the color will remain red or reddish. The hydrometer is then inserted in the specimen and the reading taken from the scale corresponding to the color of the specimen, that is, on the red scale if the specimen remains red and on the brown scale if the specimen changes to yellow. Another part of the specimen is then diluted in accordance with the hydrometer reading. Preferably this second part of the specimen has a volume of 5 cc. If the hydrometer reading is five on either scale no dilution is required. If the hydrometer reading is ten on either scale there is added to the specimen sufficient water to increase the volume of the specimen to a total of 10 cc. If the hydrometer reading is fifteen the water is added in sufficient volume to increase the total to 15 cc., and so on in accordance with the hydrometer readings. The specimen when so diluted is ready for testing for histidine.

In carrying out the final of histidine test the measured portion of the diluted specimen is treated to eliminate therefrom substances which might interfere with the test and to then determine the presence of histidine. The proportions hereinafter stated are based upon 5 cc. of the diluted specimen. This quantity of the specimen is placed in a test tube, or other suitable receptacle, and there is added thereto a soluble barium salt, such as barium chloride, barium hydroxide or barium nitrate, for the purpose of precipitating sulfates and phosphates in the specimen. Preferably three drops of a 10% solution of barium chloride in water are added to the 5 cc. of the specimen and agitated, as by shaking the tube. There is then added to the specimen a nonmetallic precipitant for barium, which may be either ammonium sulfate or sulfuric acid. Preferably the two are combined as a solution of 1.5% ammonium sulfate and 1.5% sulfuric acid and three drops of this solution are added to the specimen and the latter is again agitated, thus precipitating any excess barium in the specimen. A metallic permanganate is then added to the specimen to eliminate any nitrates which might be present.

A .33% potasium permanganate and .15% sulfuric acid solution in water is then added to the specimen a drop or two at a time and the specimen agitated until a pink color appears in the specimen and remains for approximately one-half minute thus oxidizing any nitrites therein. By heating the mixture, as by placing the test tube in a beaker of hot water and agitating the same, the pink color is caused to disappear and the greater portion of the precipitate settles to the bottom of the tube. This usually requires about three minutes. The test tube is then removed from the beaker and cooled, and the clear liquid is poured into a clean test tube. There is then added to the clear liquid thus obtained a solution of bromine and acetic acid which forms an addition product with the histidine. After this addition product has been formed there will be free bromine in the solution which should be removed. The addition product is slow in forming and the free bromine should be retained for a limited time, usually about ten minutes. For this purpose a mixture of 25% bromine-water and 33% acetic acid is then added to the clear liquid and the mixture agitated, that specimen is then tested on a suitable test paper, such as starch iodide test paper. A glass rod may be inserted in the specimen and touched to the test paper. A purple stain should show on the test paper at the point touched by the rod. If the spot does not appear an additional ½ cc. of the bromine acetic acid solution should be added to the specimen and again tested by the rod. This should be repeated approximately every one-half minute until a purple stain shows on the test paper and remains throughout a ten minute period. After the expiration of the ten minute period there is added to the specimen a compound which will combine with the free bromine and form a soluble compound, such as sodium urea, sodium arsenite or arsenious acid. Preferably three drops of a one and one-half percent sodium ureate solution are added to the specimen. The purple stain should disappear and if it does not additional sodium ureate is added, a drop at a time and the mixture is tested until no purple stain appears. There is then added to the specimen one-half cc. of a solution comprising 3% ammonium carbonate, 67% ammonium hydroxide and 30% water which combines with the addition product to form a colored soluble compound. The specimen, after this solution has been added, is heated in a hot water bath for about two minutes. If no color change takes place more of the solution should be added, preferably five drops. If the solution then changes to a red or purple or a bright red pink color this is a positive indication of histidine and therefore of pregnancy. A very faint pink or no color would indicate the absence of histidine and therefore non-pregnancy. In effecting this last step it is preferable that the test tube should be removed from the hot water bath and viewed by looking lengthwise through the same toward an electric light.

While we have described the preferred method of effecting our test, we wish it to be understood that we do not desire to be limited to the specific details thereof as in at least some instances the materials or the proportions thereof may be varied.

Having now fully described our invention what we claim as new and desire to secure by Letters Patent is:

1. A method of testing a specimen of urine for histidine indicative of pregnancy, which comprises adding a pH indicator to the specimen to determine the pH thereof, diluting the specimen with water to a specific gravity of about 1.005 to about 1.009, the above specific gravity being varied in accordance with the determined pH of the specimen, eliminating from a five cubic centimeter portion of the diluted specimen substances which might interfere with the subsequent test, brominating the histidine in said portion of the specimen, in an acid medium, removing excess bromine, and adding to the mixture an ammonium hydroxide-ammonium carbonate reagent in the presence of heat to effect a color change, the presence of which is indicative of the presence of histidine in the specimen.

2. A method of testing a specimen of urine for histidine indicative of pregnancy, which comprises adding a pH indicator to the specimen to determine the pH thereof, diluting the specimen with water to adjust the specific gravity thereof to a predetermined value based on the pH of the specimen which lowers the concentration of histidine in the specimen so that the histidine in the specimen of urine collected from a non-pregnant woman is not detectable and the histidine in the specimen of urine collected from a pregnant woman is detectable by the subsequent test, the above specific gravity being varied in accordance with the determined pH of the specimen, eliminating from a portion of the diluted specimen substances which might interfere with the subsequent test, brominating the histidine in said portion of the specimen in an acid medium, removing excess bromine, and adding to the mixture an ammonium hydroxide-ammonium carbonate reagent in the presence of heat to effect a color change, the presence of which is indicative of the presence of histidine in the specimen.

3. A method of testing a specimen of urine for histidine indicative of pregnancy, which comprises adding a pH indicator to the specimen to determine the pH thereof, diluting the specimen with water to adjust the specific gravity thereof to a predetermined value based on the pH of the specimen which lowers the concentration of histidine in the specimen so that the histidine in the specimen of urine collected from a non-pregnant woman is not detectable and the histidine in the specimen of urine collected from a pregnant woman is detectable by the subsequent test, the above specific gravity being varied in accordance with the determined pH of the specimen, eliminating from a portion of the diluted specimen substances which might interfere with the subsequent test, brominating the histidine in said portion of the specimen in an acid medium, removing excess bromine, and adding to the mixture ammonium hydroxide in the presence of heat to effect a color change, the presence of which is indicative of the presence of histidine in the specimen.

RICHARD M. CARSON.
REUBEN R. SAEKS.

REFERENCES CITED

The following references are of record in the file of this patent:

UNITED STATES PATENTS

| Number | Name | Date |
| --- | --- | --- |
| 2,171,961 | Fortune | Sept. 5, 1939 |
| 2,171,962 | Fortune | Sept. 5, 1939 |
| 2,186,902 | Fortune | Jan. 9, 1940 |
| 2,195,339 | Porter | Mar. 26, 1940 |
| 2,221,913 | Edelmann | Nov. 19, 1940 |
| 2,367,268 | Edelmann | Jan. 16, 1945 |